United States Patent [19]

Schleicher et al.

[11] Patent Number: 5,930,142
[45] Date of Patent: Jul. 27, 1999

[54] NUMERICAL CONTROL SYSTEM WITH HIERARCHICAL INTERPOLATION FUNCTIONS

[75] Inventors: Siegfried Schleicher, Erlangen; Johannes Welker, Neumarkt; Bernd Quaschner, Moehrendorf, all of Germany

[73] Assignee: Siemens Aktiengesellschaft, München, Germany

[21] Appl. No.: 08/668,674

[22] Filed: Jun. 25, 1996

[30] Foreign Application Priority Data

Jun. 26, 1995 [EP] European Pat. Off. ............. 95109953

[51] Int. Cl.⁶ .................................................. G05B 19/18
[52] U.S. Cl. ....................................................... 364/474.31
[58] Field of Search ......................... 364/474.01, 474.28, 364/472.29, 474.21, 148–150, 474.05, 474.23, 474.31, 474.24, 132, 191; 318/569

[56] References Cited

U.S. PATENT DOCUMENTS

| | | | |
|---|---|---|---|
| 3,715,644 | 2/1973 | Bobrowicz et al. | 318/573 |
| 4,484,286 | 11/1984 | Nagamine et al. | 364/474.31 |
| 4,636,938 | 1/1987 | Broome | 364/191 |
| 5,132,912 | 7/1992 | Ito et al. | 364/474.31 |
| 5,159,254 | 10/1992 | Teshima | 318/611 |
| 5,214,591 | 5/1993 | Sasaki et al. | 364/474.31 |
| 5,221,884 | 6/1993 | Teshima | 318/569 |
| 5,227,978 | 7/1993 | Kato | 364/474.31 |
| 5,268,834 | 12/1993 | Sanner | 364/151 |

FOREIGN PATENT DOCUMENTS

| | | |
|---|---|---|
| 0 530 790 A2 | 3/1993 | European Pat. Off. . |
| 39 40 621 A1 | 6/1991 | Germany . |
| 92 06 93 | 8/1992 | Germany . |

*Primary Examiner*—James P. Trammell
*Assistant Examiner*—Matthew Smithers
*Attorney, Agent, or Firm*—Kenyon & Kenyon

[57] ABSTRACT

A process and device are provided for numerical control, in particular, of machine tools or robots having a plurality of axes. The process and device use base interpolations performed on a block-by-block basis and, in addition, one or more gear interpolations that convert a controlling guiding motion into a follower motion. Each gear interpolation is assigned parallel to one or more base interpolations and functions independently of block limits of a base interpolation in its own gear interpolation segments. The coupling characteristic of a gear interpolation ensues from a coupling factor, from a control curve stored in tabular form, or from a control curve stored as a mathematical functional equation. The gear interpolations can be obtained from so-called gear interpolation units and can be cascaded. Moreover, they can be fed back directly or indirectly and can be variably interconnected, as needed, with any existing sources and actuators. Besides generating geometric reference signals, gear interpolations can also be used for process control and process monitoring.

21 Claims, 2 Drawing Sheets

NUMERICAL CONTROL SYSTEM WITH HIERARCHICAL INTERPOLATION FUNCTIONS

FIELD OF THE INVENTION

The present invention relates to a process and a device for numerical control, in particular, of machine tools or robots having a plurality of axes, especially using base interpolations that work on a block-by-block basis.

BACKGROUND OF THE INVENTION

In conventional numerical control systems, in particular for machine tools and robots, a motion sequence for a plurality of axes is programmed for a sequence-controlling base interpolator through so-called base interpolation segments having a side-by-side arrangement. To this end, in conformance with the participating axes of motion, one can select from a limited number of configurations, as well as among various interpolation methods, such as linear, circular, and spline interpolation. As a rule, motion segments and associated interpolation methods, as well as the feed function are performed as block-orientated functions. For this purpose, a control data block contained in an existing control data program or parts program is processed. The input variables of the base interpolation are always the path parameters; the output variables are always either the setpoint position or the corresponding velocity tool path feedrate.

For complex multi-axis motion, e.g., a complex machining process, several axial reference variables must be made available, for which a plurality of synchronously executed channels, so-called NC channels when referring to machine tools, are necessary for the cutting motion, the feed motion, and the infeed motion of gear slotting. To make available such axial reference variables, a reference-value interpolation that is directly coupled to geometric data production does not yet exist at the present time for a process control or closed-loop process control. Moreover, no CNC-integrated monitoring system that is directly coupled to geometric data production is known.

Typically, closed-loop process control parameters or monitoring control parameters can only be adapted to changing technological process conditions by coupling them to a block change within a control data program. That is why one is only able to program relatively rough monitoring values, which do not apply exactly to the entire run of the machining segment, over the entire machining segment, an interpolation segment. It is only at a block change that one is able to adapt control parameters or reference values to technological process conditions. When working with a conventional base interpolation, as a rule, the geometry of a nominal path must be broken down into quite a number of path segments or blocks. However, this does not allow any high-speed machining with high tool path feedrates, as blocks have to be preprocessed frequently and, therefore, entail considerable computational outlay. In addition to this, under known methods heretofore, a monitoring limiting value is activated already at the instant when, for example, a milling cutter is replaced as an active tool in the milling spindle or is activated in the processing sequence. However, the monitoring reference value remains constant during a control program block.

OBJECTS AND SUMMARY OF THE INVENTION

Therefore, an object of the present invention is to develop a process and device of the type mentioned at the outset that enables complex geometric and technological setpoint value profiles and those associated with these or coupled thereto to be produced very simply, in particular for special technologies such as gear hobbing, gear slotting, gear grinding, or camshaft grinding. At the same time, an object of the present invention is to produce tolerance-band profiles or limit-value profiles for a process monitoring. It is intended that the machining process, which is controlled in a control channel with a control-data parts program, be expanded to include a plurality of coupled, simultaneously running interpolations. To this end, a reference-value interpolation for a process control or closed-loop process control should be coupled directly to the geometric data production and, moreover, a monitoring system coupled directly to the geometric data production should be made available. In addition, the present invention should make it possible for an adaptation of closed-loop process control parameters or monitoring-control parameters to changing technological process conditions of block changes to be decoupled within a control program and also render possible a finer resolution of monitoring values tailored to the entire run of a machining segment.

In accordance with the present invention:
(a) one or more gear interpolations, which convert a controlling guiding motion into a follower motion, are performed;
(b) each gear interpolation is assigned in parallel to one or more base interpolations; and
(c) each gear interpolation functions independently of block limits of a base interpolation in its own gear interpolation segments.

In one embodiment of the present invention, the principle of a gear interpolation, according to which a controlling motion drives a follower motion, is realized as an especially flexible and variable principle. As is described in German Utility Model Patent G 92 06 933.9, to produce the nominal path when sampling a stored nominal axial path, such a path is stored in dependence upon a table-location indicator of a table. From the cited document, one can infer that to produce the nominal path, not only one, but two nominal axial paths are stored in one table, and the sampling operation can be carried out from the table. This possibility for a coupling within a gear interpolation shall now be expanded in accordance with the present invention to the effect that the gear interpolation can now be stored for as many nominal axial paths as desired and also for other nominal parameter runs, such as setpoint reference variables. In addition, the possibilities for a coupling within a gear interpolation through the application of other coupling methods will continue to be developed. To achieve this objective, the coupling characteristics of a gear interpolation are programmed by means of a coupling factor and/or a control curve stored in tabular form, in particular for as many nominal axial paths and/or setpoint reference variables as desired, and/or by means of a control curve stored as a mathematical functional equation.

In another embodiment of the present invention, the application possibilities of the introduced gear interpolations are expanded and conceived so as to be especially flexible. This embodiment enables the newly introduced gear interpolations to be performed as freely configurable interpolations, with and aside from already existing base interpolations. This is achieved by
(a) gear interpolations being cascaded and/or
(b) gear interpolations being fed back directly or indirectly, in that the output value or the output values of one or more gear interpolations are used as the input value of these and/or of one base interpolation and/or of other gear interpolations; and/or (c) gear interpolations being variably interconnected, as needed, with any existing sources and actuators.

In another embodiment of the present invention, gear interpolations and their parameterization can be programmed within the framework of the form that is available when working with base interpolations and is customary for NC parts programs or control-data programs. This is attained by a gear interpolation programmed in a control-data program on a block-by-block basis with respect to switch-on conditions and switch-off conditions for the gear interpolation segment and/or the assignment of a coupling factor or a control curve and/or of the logical system organization of a plurality of interpolations.

In another embodiment of the present invention, gear interpolations are decoupled from limitations of the base interpolation, through which means a greater flexibility, as well as a better and, above all, more exact application of gear interpolations tailored to the control task is rendered possible. This is achieved by gear interpolations activated in accordance with their programmed switch-on conditions or deactivated in accordance with their programmed switch-off conditions during a control program run independently of its block limits.

In another embodiment of the present invention, configuration parameters of the gear interpolation are decoupled from the block limits conventionally provided when working with base interpolations for value changes, so that at any desired locations within a control data block, changes can be made to parameters of gear interpolations. This objective is achieved by a coupling factor and/or a control curve of a gear interpolation segment parameterized by means of switch-on conditions and/or switch-off conditions and switched on or switched over by means of the above-described conditions independently of control-program block limits.

In another embodiment, the application possibilities for the gear interpolations according to the present invention are substantially expanded, as they are now able to be used not only to produce geometric setpoint values, but also for other control and monitoring purposes. This is possible because not only is an output of one or more gear interpolations used for a geometry interpolation, but, alternatively, also for the reference-value interpolation, in particular for process control and monitoring.

In an additional embodiment according to the present invention, the parameterization possibilities are expanded with respect to the coupling characteristics of a gear interpolation, which converts a controlling guiding motion into a follower motion, in that the values stored therein in tabular form do not have to be definitively specified for the coupling characteristics of the control curves provided. This is achieved when a control curve is learned for the coupling characteristics of a gear interpolation, in particular by using a neural network.

In another embodiment according to the present invention, it is possible that configurations of gear interpolations that have been undertaken one time need not be continually confirmed, but rather be globally available until there is a desired configuration change. This is achieved by the configuration of one or more gear interpolations being active in each case over a control-program block and beyond the control program until it is explicitly deselected.

A device for implementing the process in accordance with the present invention is distinguished in that it is realized effectively with simple means and limited outlay. Moreover, it can be integrated quite simply in already existing numerical control systems. In addition, with respect to already existing base interpolation units, measures are taken that make it possible to undertake an especially flexible combination of known base interpolation units and newly introduced gear interpolation units. This is achieved as a result of one or more gear interpolation units being provided; gear interpolation units being connected via a switching block to reference variables, and interconnected among themselves, and/or to a base interpolation unit; outputs of gear interpolation units and/or base interpolation units fed back via the configuration switching block to their inputs.

The advantages attained with the present invention include, in particular, that complex geometric technological setpoint value profiles and those assigned or coupled thereto can be produced simultaneously. Besides producing nominal paths, it is also possible to specify tolerance-band profiles or switching thresholds simultaneously with a process control or process monitoring. This is achieved without necessitating a multiplicity of parts programs in an NC channel for controlling the machining process; instead, as before, one is able to work with one single parts program, in that machining processes that are controlled in such a way are expanded to include a plurality of coupled, simultaneously running interpolations. To this end, possible reference value interpolations can be directly coupled to the geometric data production, from which monitoring systems linked directly to the geometric data production are able to be produced. Moreover, this allows an adaptation of geometric data production, closed-loop process control, and process monitoring to changing technological process conditions to be decoupled from the block change within a control program, thus achieving a finer and more defined resolution tailored to the entire run of a machining segment.

Other advantages and inventive details are set forth in the following description of an exemplary embodiment.

DETAILED DESCRIPTION

Figure 1:
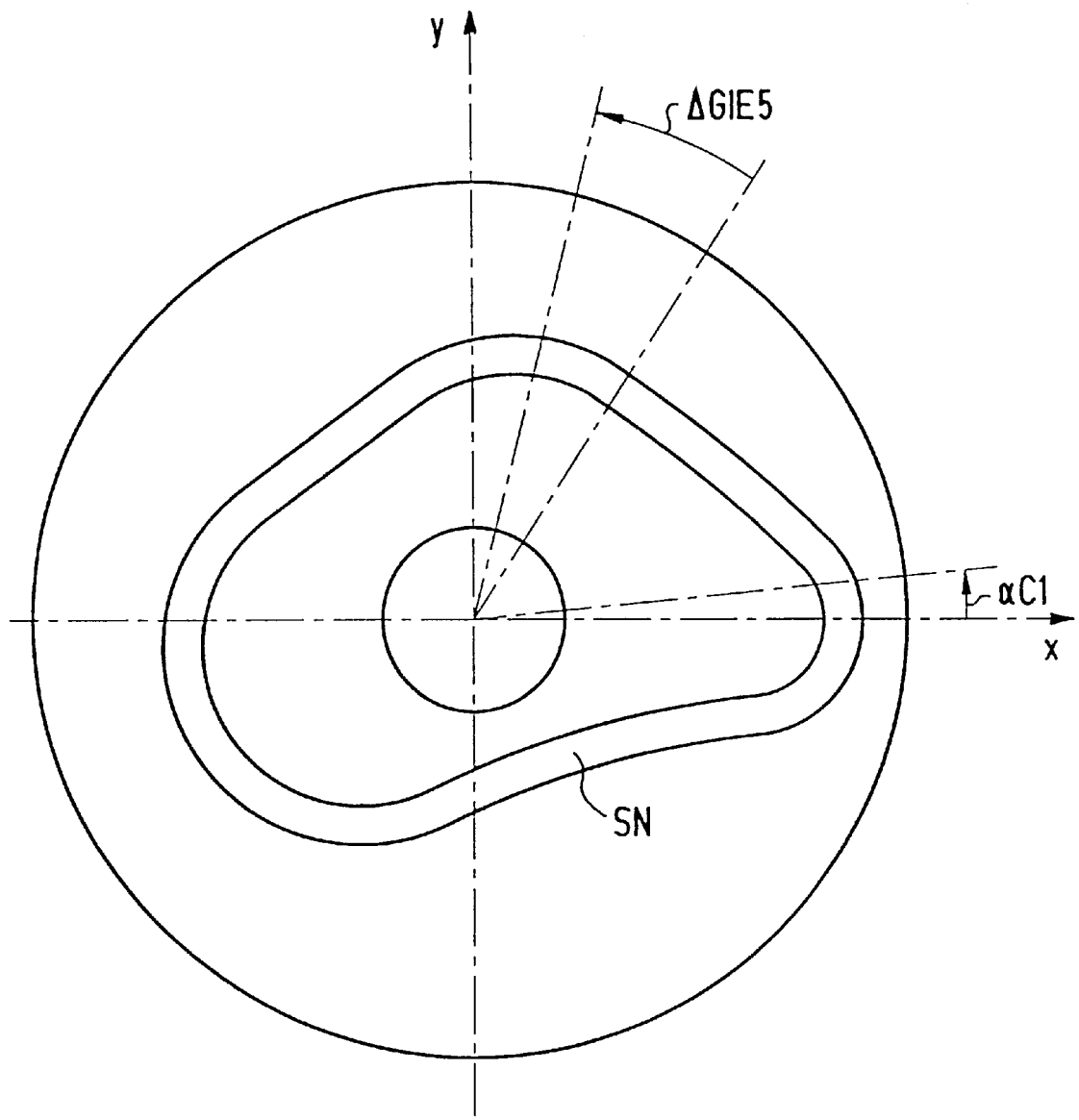
FIG. 1 is a view of a blank workpiece positioned on a milling machine table in the X-Y plane for producing a mechanical control curve in the form of a control groove.

The present invention will be described on the basis of the premachining of a mechanical control curve. To this end, a blank workpiece is clamped on a milling machine table in the X-Y plane to receive this mechanical control curve. The control curve SN to be produced describes a closed curve in this case. The mechanical control curve that is closed upon itself is either described by a Cartesian point sequence $P_{i(x,y)}$ or, as shown in FIG. 1, by a polar coordinate point sequence $P_i(\alpha C1, r)$ dependent upon a rotational angle $\alpha C1$ of an imaginary axis C1, since it is not possible to describe the curve shape in a few segments using simple arithmetic expressions in the form of a mathematical function. In addition, FIG. 1 shows a section $\Delta GIE5$ of the control groove to assist in the later explanations of the gear interpolation units.

Figure 2:
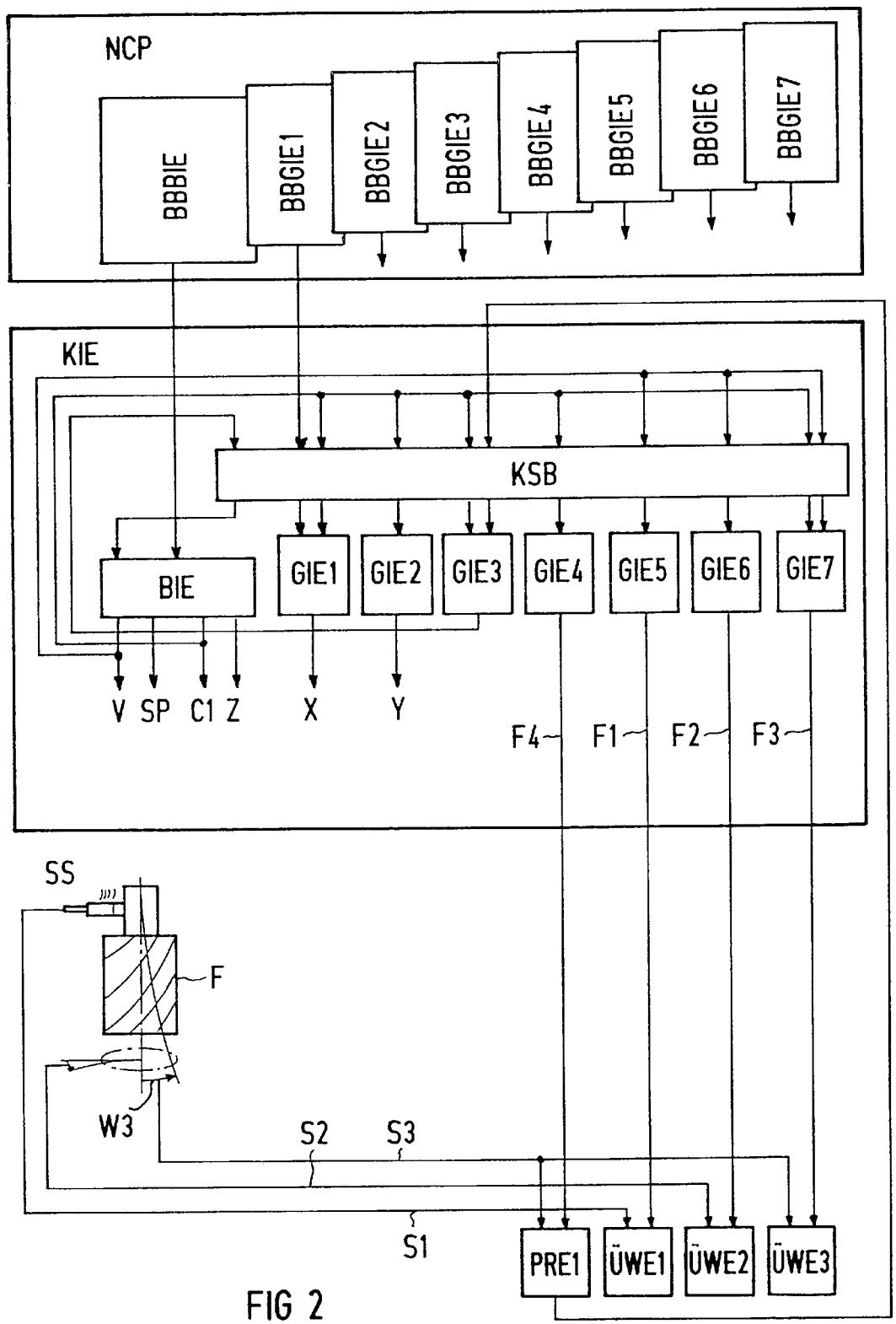
FIG. 2 is a schematic illustration of a numerical control system for a milling cutter for geometric data production, process control, and process monitoring.

FIG. 2 shows a numerical control system that controls a milling cutter F. The control system is subdivided into one area that contains data of an NC parts program NCP, as well as into a configurable interpolator unit KIE. In addition to a conventional base interpolator unit BIE, the configurable interpolator unit KIE comprises a plurality of gear interpolator units GIE1–GIE7. Both the base interpolator unit BIE, as well as the gear interpolator units GIE1–GIE7 are linked to one another via a configuration switching block KSB. The NC program area NCP contains an NC parts program, which is subdivided into a plurality of command blocks, which are assigned, on the one hand, to the base interpolator unit BIE in the form of a base interpolation command block BBBIE and, on the other hand, to a plurality of gear interpolation command blocks BBGIE1–BBGIE7, which are each allocated to a corresponding gear interpolation unit GIE1–GIE7. The output of each command block is connected to the input of the corresponding interpolation unit and triggers the latter with the data contained in the specific command block. The base interpolation unit BIE, as well as the gear interpolation units GIE1-GIE7 produce output variables, which are partially fed back via the configuration switching block KSB to themselves or to other interpolation units. Thus, the output of the gear interpolation unit GIE3 is fed back to the base interpolation unit BIE. The gear interpolation units GIE1 and GIE2 produce geometric reference signals for triggering the X-axis X and the Y-axis Y. At the output, the base interpolation unit BIE makes available reference signals for the feed V, the spindle SP, the imaginary C1-axis C1, as well as another axis in the direction of the feed V, namely the Z-axis Z. Both the output signal for the feed V, as well as the signal for the imaginary C1-axis C1 are fed back via the configuration switching block KSB to the gear interpolation units GIE1–GIE7. The gear interpolation units GIE4–GIE7 produce reference variables F1–F4 for process control and process monitoring. For this purpose, the reference signals F1–F3 are each fed to a monitoring unit ÜVE1–ÜVE3, and the reference variable F4 to a process control/closed-loop process control unit PRE1. In addition, the process control/closed-loop process control unit PRE1 and the monitoring units ÜVE1–ÜV3 receive signals S1–S3, which are detected at a milling cutter F controlled by the base interpolation units BIE. A signal S1 for the acoustic emission is fed via a sound sensor SS to the monitoring unit ÜVE1. The signal S2 describes the momentary moment of rotation on the milling cutter V, and is supplied to the monitoring unit ÜVE2. The signal S3 is a measure for the determined milling cutter deflection and is fed both to the process control/closed-loop process control unit PRE1, as well as to the monitoring unit ÜVE3. The output of the process control/closed-loop process control unit PRE1 is fed back to the configuration switching block KSB.

The gear interpolation units GIE1–GIE7 work in parallel with the base interpolation unit BIE, which interpolates, e.g., in accordance with one of the base interpolation types: linear, circular, helical, spline, and screw-thread interpolation. Moreover, the gear interpolation units GIE1–GIE7 can be variably connected to the base interpolation unit BIE, as well as variably among themselves, and variably to any desired sources and actuators that are available in the NC system. Each of the gear interpolator units GIE1–GIE7 interpolates a follower reference signal dependent upon a control input signal, so that in accordance with the gear principle, a control motion drives a follower motion. In principle, one or more gear interpolations can also be performed in parallel with a plurality of independent base interpolations. Together with the gear interpolations, gear interpolation segments are introduced, which are able to be specified in the NC parts program by programmable switching conditions, freed from the block limits of the base interpolation. In their programmed gear interpolation segments, each gear interpolation unit GIE1–GIE7 generates its output signal or its output signals, either according to a linear coupling factor, according to a wheel gear, according to a mathematical function, or any desired function curve or control curve stored in a table. Such a control curve can store a plurality of nominal parameters, in particular a plurality of nominal axial paths for a multi-axis machine tool, in a table, dependent upon a table-location pointer. In this case, it is equally possible to both determine the parameter values and definitively specify them for a control task, as well as to determine them during the operation in a training phase and, by this means, to adapt them to changing ambient conditions.

Gear interpolation units GIE1–GIE7 can be connected by means of parts-program commands, e.g., in the form of a gear interpolation command block BBGIE1–BBGIE7, to a configurable interpolator unit KIE.

Besides a simple connection of the outputs of the gear interpolation units to axis actuators, it is also possible to connect them to any desired subsequent actuators. Thus, for example, an output can be connected to a control input for an interpolation parameter, such as path or velocity, to another gear interpolation unit or, however, as a limiting value for a process control, such as tool breakage or a limit-switch position. The configuration remains active in each case during a parts program block and beyond the parts program until it is explicitly deselected and the new configuration is active.

The exemplary embodiment shown in FIGS. 1 and 2 for producing a control groove into a blank work piece is realized by first premilling the control groove, because of its depth, in several cycles with an appropriate depth infeed adjustment, and finally by completing the milling of the control groove using a second milling cutter. Since the curve shape of the control groove cannot be described by a few segments using simple arithmetical expressions in the form of a mathematical equation, the curve shape is stored in tabular form as a polar coordinate sequence $P_i(\alpha C1, r)$ in dependence upon a rotational angle $\alpha C1$. For the conventional base interpolation, it would be necessary to break down the path into a multiplicity of linear, circular, or spline path segments, requiring, accordingly, a high number of NC data blocks. However, this would not permit a high-velocity machining with high path feed rates because of the frequent and quite costly block preprocessing.

In known methods heretofore, to perform a tool monitoring function, the monitoring limiting value is activated already at the instant when the milling cutter F is replaced in the milling spindle or is activated in the machining processing sequence. The monitoring reference value remains constant during a parts program block and is not able to be adapted to possible load fluctuations. In conventional methods, the existing potential is not exhausted in a plurality of application cases. However, a reference value is used that represents the least common denominator. Accordingly, the global limiting value is within a data block. Consequently, under known methods heretofore, it has not been possible to adapt the limiting-value characteristic to the local limitations in each case.

At this point, in accordance with the present invention, by means of a configuration command block KSB in the parts program of the NC program area NCP, a configurable interpolator unit KIE comprised of a plurality of interpolator units, thus of a base interpolator unit BIE, as well as a plurality of gear interpolation units GIE1–GIE7 is interconnected and can assume both a nominal-path or a reference-value interpolation for the complex geometric motions, as well as limiting values for a process monitoring.

To generate geometric reference signals for the milling cutter F as a tool and for the workpiece situated on a movable tool table, the control guidance of the milling spindle SP and of the infeed adjustment axis Z, which determines the groove depth, is undertaken in a conventional manner by the base-interpolator unit BIE. The reference values for the milling table axes X and Y required for producing the path curve are interpolated by parallel working gear interpolation units GIE1 and GIE2 and applied in accordance with the configuration to the milling table axes X and Y. The two control curves for the gear interpolation units GIE1 and GIE2 supply the appropriate coordinates in the X- and Y-direction or the X/Y travel increments per sampling time period as a function of the rotational angle $\alpha C1$ of the imaginary axis C1.

The imaginary axis C1, which represents a shared controlling axis for the gear interpolation units GIE1 and GIE2, is interpolated by the base interpolation unit BIE and is an indication of how far the cycle along the control groove SN has progressed. For this reason, the machining segments are programmed in the parts program of the NC programming area NCP as interpolation segments or as the machining segments for the imaginary rotary axis C1.

To mill out the groove depth, an individual block can be programmed over several rotations about the C1-axis with an appropriate continuous depth infeed adjustment for the Z-axis Z. Within the scope of the machining by means of a conventional basis-interpolation unit BIE, this procedure has the disadvantage, however, that monitoring limits are only able to be specified one time within the individual parts program block.

Alternatively, however, the control process in accordance with the present invention also permits the programming of a plurality of cycle blocks with intermediate depth-infeed adjustment blocks in the Z-axis Z. The control process in accordance with the present invention makes it possible to mill out the control groove SN with a single parts program block and, nevertheless, to thereby undertake the necessary feed adaptation to the changing cutting-engagement conditions during one milling cutter cycle in the path curve. This is achieved in that the gear interpolation unit GIE3 stipulates the feed rate to the base interpolation unit BIE in accordance with a control curve determined for this task.

In the illustrated exemplary embodiment, the imaginary rotary axis path C1 is applied as a controlling signal to the gear interpolation units GIE1 and GIE2, in that the corresponding output value C1 of the base-interpolation unit BIE is fed back via the configuration switching block KSB to the gear interpolation units GIE1 and GIE2. It is a question in this case of a setpoint-side dependency for the follower-axis coupling. Moreover, the control process according to the present invention also makes it possible to undertake an actual-value side dependency in the follower-axis coupling. Thus, in the present exemplary embodiment, the case of an actual-value-side follower-axis coupling is also conceivable. To this end, the gear interpolation units GIE1–GIE7 would have to be so configured in the configurable interpolator unit KIE that the rotary axis C1 is provided in this case as the effective axis of a rotary indexing table, on which the workpiece is clamped. The required radial infeed adjustment is then realized by means of one of the two table displacement axes X or Y. This configuration offers the advantage over the previously described exemplary embodiment that, given an unaltered milling cutter diameter, the groove width is variable, in that the radial starting position of the milling cutter is selected accordingly. The reference value for the infeed axis would then be interpolated by means of the gear interpolation unit GIE1. In this case, the control signal for the gear interpolation unit GIE1 is the C1 actual positional value.

For many machining tasks, it is technologically advantageous when the workpiece already turns when the ideal infeed-axis coupling is switched on. To avoid a jerking movement in this case, the coupling should be closed exactly when the radial infeed rate passes through zero. This is possible using the controlling process according to the present invention by specifying an appropriate start condition, since a gear interpolation is programmed in a control data program block-by-block with respect to predetermined switch-on or switch-off conditions. Such switch-on or switch-off conditions are used, on one hand, for individual gear interpolation segments and, on the other hand, in the assigning of a coupling factor, of a parametric control curve or of a mathematical function. Moreover, the logical organization of a plurality of gear interpolations can also be programmed on the basis of such switch-on or switch-off conditions. Therefore, the gear interpolations are activated during a control-program sequence independently of its block limits in accordance with their programmed switch-on conditions and deactivated in accordance with their programmed switch-off conditions. Thus, with respect to switching on the radial infeed-axis coupling, similar requirements exist during the switch-off operation, when the workpiece rotation is supposed to remain unchanged after the radial infeed coupling is canceled. It is also advantageous in this case when the radial infeed rate passes through zero when the radial infeed coupling is canceled.

Due to the changing cutting engagement conditions during the milling cycle, a C1-axis feed programmed constantly over the entire cycle would lead either to an overloading of the milling cutter or, were the value programmed to be low enough, would lead to an insufficient capacity utilization over broad sections of the curve path SN. Given a conventional programming and many individual parts program blocks, one can achieve the feedrate characteristic required for a visible machining sequence and which takes into account the changing engagement conditions of the milling cutter F during the cycle. However, this requires quite a few block changes and times.

With respect to generating reference signals for the process control by means of the control process according to the present invention, the setpoint velocity of the C1-setpoint value interpolation is controlled by the gear interpolation unit GIE3 in dependence upon the C1 rotational angle $\alpha C1$ reached. For this purpose, the C1 reference signal C1 is also applied to the input of the gear interpolation unit GIE3, and the output signal of the gear interpolation unit GIE3 to the control input for the influencing the feed rate of the base-interpolation unit BIE, the control input quasi possessing the function of an override input. The dependency between the output signal of the gear interpolation unit GIE3 and the named control input of the base-interpolation unit BIE is stored in a control curve for the gear interpolation unit GIE3. The named control curve can then be established already during the program development. Because the cutting-engagement conditions are not easily comprehensible, the characteristics of such control curves when working with the control process according to the present invention are often first determined or learned during initial operation of the parts program or optimization of the parts program. This is achieved, for example, while measuring the load occurring in each case.

One advantageous possibility for determining the characteristics of such control curves in accordance with the present invention involves a neural network or interconnected neural networks used for this purpose. Through this measure, a change in the parameters can be taken into consideration in the course of the operation of a machine tool using the control process according to the present invention. Moreover, by applying this measure, one can consider parameters as input variables, for which sufficient information was not available to determine the parameters using a conventional process. In the training phase, a neural network which is not illustrated in FIG. 2 and which is advantageously composed of an input layer with a plurality of input neurons, one or more intermediate layers, and of an output layer with a corresponding number of output neurons, is supplied with the setpoint position as well as the actual position, which leads to a scaling of this information. Moreover, other information signals, which describe the status of the tool, in the case of the exemplary embodiment of the milling cutter F, can be used as input variables. These are, for example, the monitoring signals S1 through S3. The output variable of this neural network is then a control curve, which describes a dependency of the CI reference signal of the gear interpolation unit GIE3 and of the feed-rate influencing of the base-interpolation unit BIE, the dependency being optimized with respect to the actual loading conditions of the milling cutter F. One advantageous type of such a neural network is represented, for example, by a so-called multilayer perceptron. In addition, however, other types of neural networks can also be advantageously used, such as so-called Hoppfield networks or so-called Kohonen feature maps. The last-mentioned types of neural networks have the advantage that it is not necessary to specify any actual values during the training phase to learn a control curve, but rather a suitable control curve is determined in a self-optimizing manner solely by making available signals S1 through S3.

In the exemplary embodiment shown in FIG. 2, the gear interpolation unit GIE4 supplies a flexure reference signal F4 for a process control/closed-loop process control unit PRE1, which, beginning with the programmed basic feed rate, always adjusts the active feed rate V so that the permissible milling-cutter flexure values W3 specified in the control curve of the gear interpolation unit GIE4 in dependence upon the groove path cycle are retained. Consequently, high accuracy requirements can be met for the groove, given an increased productivity, by utilizing an optimal feed rate. This is achieved in that in regions of the groove shape having less radial change, as shown, for example, on the basis of FIG. 1 with the partial section ΔGIE5 of the control groove SN, a higher reference value can be specified for the milling cutter flexure V3 in the control curve, since the flexure is directed predominately in the groove direction and only leads then to a very small error in accuracy when working with the groove shape.

It is advantageous in this case that the correct path feed is automatically adjusted along the groove curve SN. This considerably shortens an initial operation of a parts program. This type of closed-loop process control of milling-cutter flexure reduces its feed-rate-influencing actuator within the scope of the manipulating range to the lower limit given by the system when the flexure is exceeded, and increases it when undershooting the flexure. If the flexure, thus the force acting in a direction normal to the periphery of the milling cutter F, is exceeded still at the lower feed range limit, then the flexure-monitoring unit ÜVE3 becomes active and, in fact, with a monitoring threshold, which is assigned to the minimum feed-rate in the control curve of the gear interpolation unit GIE7. A signal, such as "stop feed" or "retreat out of cut" is produced as a reaction.

As already discussed above, reference signals for monitoring the process can be produced with the control process according to the present invention. For a process monitoring for the milling-cutter spindle torque, the gear interpolation unit GIE6 supplies the feed-dependent limiting value F2 for the process-monitoring unit ÜVE2, which monitors the milling-cutter spindle torque S2. In the present exemplary embodiment, tool wear is monitored by the gear interpolation unit GIE5, which, in dependence upon an imaginary rotary axis path travel C1, interpolates the reference value for the monitoring unit ÜVE1, which monitors tool wear on the basis of the acoustics emitted by the tool. Using the milling cutter F as an example, FIG. 2 shows that the acoustic signal is tapped off by a sound sensor SS as close as possible to the tool F. The gear interpolation unit GIE5 interpolates the active momentary reference value F1 for the wear limit in dependence upon the active feed variable V. The monitoring unit ÜVE1 is only activated to monitor wear when defined cutting-engagement conditions exist. This is given, for example, in a path section where the control groove SN runs with a constant radial clearance from the center point. Such a groove-shape section with a slight radial change is shown in FIG. 1 on the basis of the partial section ΔGIE5. The selective activation of the tool-wear monitoring during the desired machining phase is realized by properly programming the switching conditions for the gear interpolation unit GIE5. The reference values F1 for monitoring wear are determined during initial operation of the parts program or, however, as already explained, stored after initial operation of the program within the scope of a learning machining by a neural network in a gear interpolation control curve, in that a configured process-state signal is measured and used in a weighted or unweighted manner as a reference value. These case-specific control curves are then used during manufacturing in the gear interpolation units GIE1–GIE7 as reference control values F1–F4 for monitoring manufacturing, e.g., as limiting values for the milling cutter torque F2 or for the feed rate V.

The milling out of the control groove SN distributed over several cycles can be programmed as a single feed-rate block for the imaginary rotary axis C1 and for the infeed adjustment axis Z in the base-interpolation section of the base interpolation unit BIE in the NC programming area NCP. The process phases, cutting in the air, chamfering, cutting, cutting out and, again, cutting in the air, take place in this block. Since the gear interpolation sections are not tied to the block limits of the base-interpolation section, the process monitoring can be activated, switched over, or switched off in freely definable process sequence sections. The gear interpolation section limits for each of the gear interpolation units GIE1–GIE7 can be programmed both parallel to the base-interpolation section, but also beyond its limits. A coupling factor or a control curve, whether it be in the form of a parameterizable table or a mathematical function, of a gear interpolation section, are parameterized by means of switch-on conditions or switch-over conditions and are switched on or switched over by means of the above-described conditions independently of the NC-program NCP and its block limits.

We claim:

1. A process for numerically controlling a device, comprising the steps of:
   performing at least one base interpolation on a block-by-block basis;
   performing at least one gear interpolation converting a controlling guiding motion into a follower motion;

assigning, in parallel, each of the at least one gear interpolation to the at least one base interpolation; and controlling a gear interpolation segment of each of the at least one gear interpolation independently of block limits of the at least one base interpolation.

2. The process of claim 1, wherein coupling characteristics of the at least one gear interpolation are programmed using at least one of a coupling factor and a control curve for a desired number of nominal axial paths and setpoint reference variables.

3. The process of claim 1, wherein coupling characteristics of the at least one gear interpolation are programmed using at least one of:

a coupling factor and a control curve stored in tabular form for a desired number of nominal axial paths and setpoint reference variables, and a control curve stored as a mathematical functional equation.

4. The process of claim 1, further comprising the step of: cascading the at least one gear interpolation.

5. The process of claim 1, further comprising the step of:

one of directly and indirectly feeding-back the at least one gear interpolation, such that at least one output value of the at least one gear interpolation is used as an input value of at least one of one of the at least one gear interpolation, one of the base interpolation, and another one of the gear interpolation.

6. The process of claim 1, wherein the at least one gear interpolation is variably interconnected with existing sources and actuators.

7. The process of claim 1, further comprising the step of:

one of directly and indirectly feeding-back the at least one gear interpolation, such that at least one output value of the at least one gear interpolation is used as an input value of at least one of one of the at least one gear interpolations, one of the base interpolation, and another one of the gear interpolation, and wherein the at least one gear interpolation is variably interconnected with existing sources and actuators.

8. The process of claim 1, wherein each of the at least one gear interpolation is programmed in a control-data program on the block-by-block basis with respect to switch-on conditions and switch-off conditions for the gear interpolation segment.

9. The process of claim 1, wherein each of the at least one gear interpolation is programmed in a control-data program on the block-by-block basis with respect to switch-on conditions and switch-off conditions of the gear interpolation segment for at least one of:

assigning one of a coupling factor and a control curve, and organizing a plurality of interpolations for a logical system.

10. The process of claim 1, wherein each of the at least one gear interpolation is programmed in a control-data program on the block-by-block basis with respect to switch-on conditions and switch-off conditions for a logical system organization of a plurality of interpolations.

11. The process of claim 1, wherein the at least one gear interpolation is one of:

activated as a function of corresponding programmed switch-on conditions, and deactivated as a function of corresponding programmed switch-off conditions during a control program run independently of its block limits.

12. The process of claim 1, wherein the at least one gear interpolation segment includes a coupling factor and a control curve, at least one of the coupling factor and the control curve is parameterized using switch-on conditions and is switched on or switched over using the switch-on conditions independently of control-program block limits.

13. The process of claim 1, wherein the at least one gear interpolation segment includes a coupling factor and a control curve, at least one of the coupling factor and the control curve is parameterized using at least one of switch-on conditions and switch-off conditions, and is switched on or switched over using the switch-on conditions independently of control-program block limits.

14. The process of claim 1, further comprising the step of:

providing an output of the at least one gear interpolation for a geometry interpolation and for a reference-value interpolation.

15. The method of claim 14, wherein the output of the at least one gear interpolation is provided for controlling and monitoring processes.

16. The process of claim 1, further comprising the step of:

learning a control curve for coupling characteristics of the at least one gear interpolation.

17. The method of claim 16, wherein the control process is learned using a neural network.

18. The process of claim 1, wherein a configuration of the at least one gear interpolations is active over a control-program block and beyond control program until the configuration is expressly deselected.

19. The device of claim 18, wherein the arrangement includes one of a machine tool and a robot having a plurality of axes.

20. The method of claim 1, wherein the device includes one of a machine tool and a robot having a plurality of axes.

21. A device for numerically controlling an arrangement, comprising:

a base interpolation unit operating on a block-by-block basis; and at least one gear interpolation unit connected via a configuration switching block to reference variables, one of the at least one gear interpolation unit coupled to at least one of:

another one of the gear interpolation unit, and the base interpolation unit, wherein at least one of first outputs of the at least one gear interpolation unit, and second outputs of the base interpolation unit are fed back to respective inputs of the gear and base interpolation units via the configuration switching block.

* * * * *